United States Patent [19]
Komamura et al.

[11] 3,876,030
[45] Apr. 8, 1975

[54] POWER STEERING SYSTEM

[75] Inventors: Seiji Komamura, Sagamihara; Katsukuni Kabuto, Tokyo, both of Japan

[73] Assignee: Kayabakogyokabushikikaisha, Tokyo, Japan

[22] Filed: Dec. 18, 1973

[21] Appl. No.: 425,740

[30] Foreign Application Priority Data
Dec. 20, 1972 Japan............................. 47-127972
Oct. 15, 1973 Japan............................. 48-115522

[52] U.S. Cl. ............ 180/79.2 D; 74/388 PS; 91/381
[51] Int. Cl. ............................................. B62d 5/06
[58] Field of Search ................. 180/79.2 R, 79.2 D; 91/381; 74/388 PS

[56] References Cited
UNITED STATES PATENTS
| | | | |
|---|---|---|---|
| 2,968,189 | 1/1961 | Walko | 180/79.2 R |
| 3,406,773 | 10/1968 | Luther | 180/79.2 R |
| 3,511,104 | 5/1970 | Piat | 74/388 PS |
| 3,552,517 | 1/1971 | Nordeen | 180/79.2 R |

*Primary Examiner*—David Schonberg
*Assistant Examiner*—John A. Pekar
*Attorney, Agent, or Firm*—Saul Jecies

[57] ABSTRACT

A power steering system where two sets of differential gear mechanism are linked to each other in relation to the input and the output sides to match the rotations of the input and the output shafts which are connected with a joint allowing relative rotation to certain extent, while a control valve switching with the relative angular displacement between the input and the output shafts, and an auxiliary input transmission mechanism switching the control valve independently of the input shaft are incorporated in the said differential gear mechanism, so that it may work only as a single transmission part and not as a load-bearing member and so that the relative characteristics may be changed variously by the application of correction inputs.

6 Claims, 27 Drawing Figures

POWER STEERING SYSTEM

BACKGROUND OF THE INVENTION

The present invention deals with a power steering system for reducing the effort required to steer cars, etc. With the purpose of improving the sensitivity of control valves and switches for actuators and achieving a larger capacity and output with a less complex structure while simplifiying its fabrication and maintenance, it has been attempted in recent years to offset the valves and switches from the control mechanism for power steering systems of this kind. For instance, attention has been attracted to a steering method where the input and the output shafts are connected by means of a differential mechanism incorporating control valves and switches in such a manner that the actuator may be driven by turning these valves and switches according to the rotation of the input shaft, and that the work may be fed back to the differential gear mechanism for steering simultaneously with its transmission to the output shaft.

In the case where the input and the output shafts are connected simply with a conventional differential gear mechanism according to the conventional method, however, it will be impossible to match the rotations of the input and the output shafts if sun and planet gears are employed, while, if bevel gears are employed for the differential gear mechanism, the input and output shaft will rotate in directions opposite to each other and it will be impossible to connect these two shafts with a joint so as to allow a certain amount of relative rotation between the input and the output shafts unlike the conventional power steering system. This means that, if steering is attempted after failure of the power source for the steering system, by transmitting the rotation of the input shaft to the output shaft, these differential gears will have to work as a load-bearing member for transmitting mechanical forces and therefore they will have to be fabricated strongly enough to bear the load, resulting in a great increase in their size and cost.

SUMMARY OF THE INVENTION

From the point of view mentioned above, the main purpose of the present invention is to present a power steering system of this kind which enables the differential gear mechanism to work always only as a signal transmitter and not as a load-bearing member, even in the event of failure of the power source for the steering system.

Another purpose of the present invention is to prevent a power steering system of this kind with various relative characteristics between the input and the output by applying various correction signals to the part forming a feedback circuit of the differential gear mechanism.

To achieve these purposes of the present invention, two sets of differential gear mechanism are employed in combination, constraining one of the differential gear sets at a certain parts while connecting a valve and switch for controlling the actuator to the corresponding part of the other differential gear set. To each of the differential gear sets thus formed the input and output shafts are symmetrically linked in such a manner that they may be matched in rotation and be connected with a joint to allow a certain relative rotation between them. Besides, in order to constrain the said part of the differential gear mechanism, a correction input transmission device which works according to signals from outside is linked to that part and therefore various relative characteristics may be produced between the input and the output.

Referring to the appended drawings, the above and other purposes, features and performances may be realized as explained by way of the following examples.

DESCRIPTION OF THE PREFERRED EMBODIMENT

Figure 1:
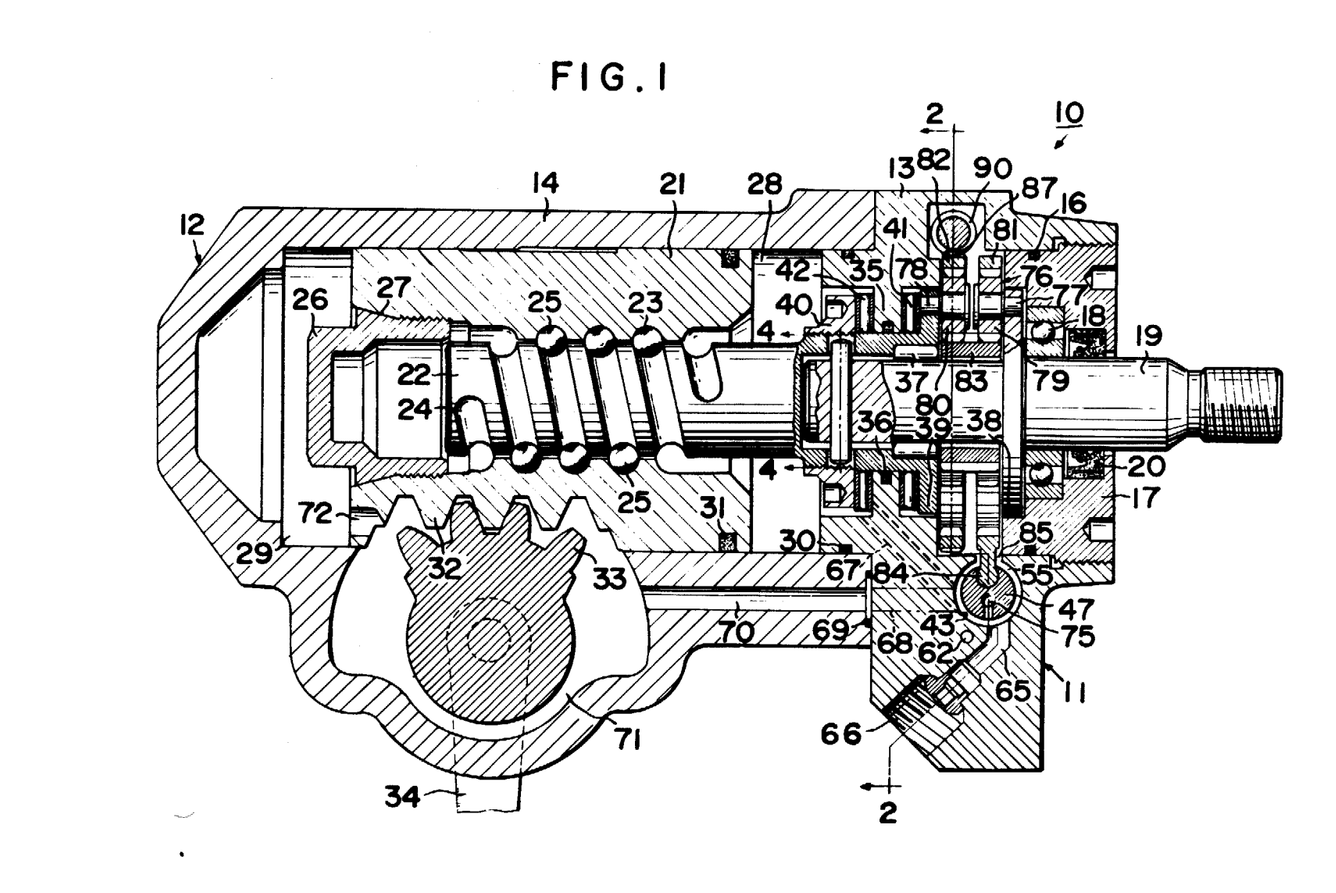
FIG. 1 a cutaway front view showing an example of a power steering system according to the present invention.
Figure 2:
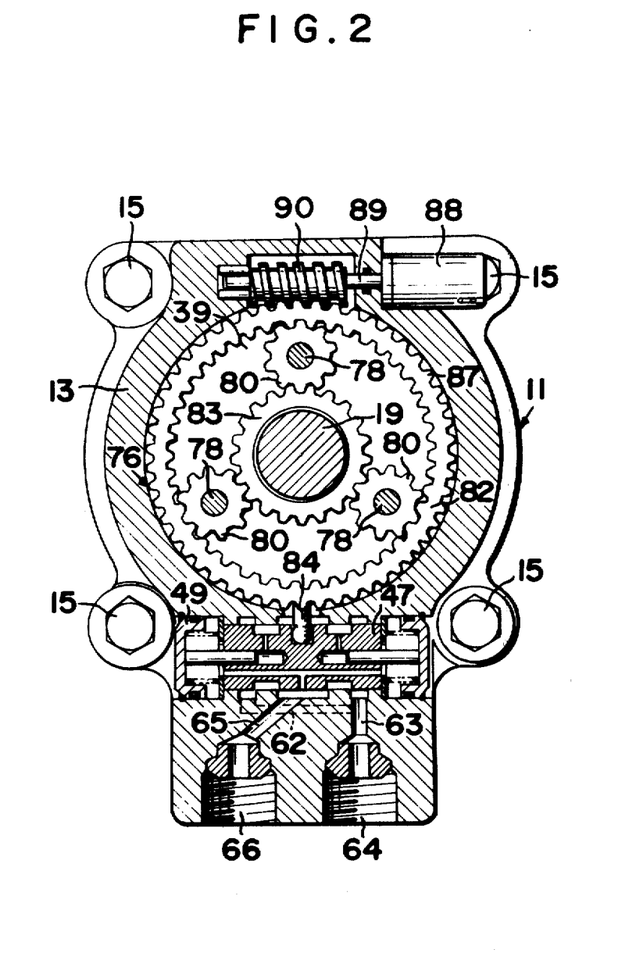
FIG. 2 a cutaway side view at the 2—2 line of FIG. 1.

In one embodiment of the present invention, the power steering system 10 shown in FIG. 1 consists of a control valve section 11 and an actuator section 12, the housings of which, i.e., the valve side body 13 and the pressure chamber side body 14, are fixed entirely by means of bolts 15 (see FIG. 2).

As will be stated below, the valve side body 13 holding the valve and control devices has a plug 17 provided with a seal 16 and screwed to the inner walls at one end and supports the stub shaft 19, i.e., the input shaft rotating freely by means of ball bearings 18 incorporated on the inner walls of the said plug 17. The base of the stub shaft (the right-hand end in FIG. 1) protrudes to the right beyond the outer surface of the said plug 17 and the protruding part of the stub shaft 19 is kept oiltight by means of an oil seal device arranged on the inner walls of the plug 17.

The pressure chamber side body 14 forming the power cylinder unit incorporates a piston body 21 sliding freely and a screw shaft 22, i.e., the output shaft, inserted along the axis of the piston body 21. Since a number of balls 25 are incorporated between the feed threads 23 24 cut along the screw shaft 22 circumference, the piston body 21 and the screw shaft 22 are jointed in such a manner that they are movable relative to each other due to the presence of these balls 25. Furthermore, the piston body 21 has a cap 26 at the head (the left-hand in FIG. 1) screwed and metal-sealed with a taper part 27. Thus, the piston body 21 separates the pressure chamber side body 14 into two pressure chambers 28 29, both of which face the inner walls of the pressure chamber side body 14, being closed tight by means of the seals 30 31, arranged around the valve side body 13 and the piston body circumference 21 and the metal seal arranged around the taper part 27 of the cap 26, respectively. A rack 32 cut at the bottom of the piston body 21 interlocks with a sector gear 33 supported by the pressure chamber side body 14. When hydraulic pressure is applied through either of the pressure chambers 28 29 to the piston body 21, therefore, the screw shaft 22 will start rotating via the feed threads 23 24 and the balls 25 and simultaneously the sector gear 33 will turn due to the rack 32 of the piston body 21 so as to drive the pitman arm 34.

The stub shaft 19 and the screw shaft 22 which function as the input and the output shafts, respectively, are arranged along the same axis. The base of the screw shaft 22 protrudes into the inside of the valve housing 13 through a seal 36 in the partition wall part 35, while the head of the stub shaft 19 is inserted into the screw shaft 22 inside via needle bearings 37.

In addition, disks 38 39 are arranged around the middle of the stub shaft 19 and the base of the screw shaft 22, respectively. The screw shaft is supported at the base by means of thrust bearings 41 42 which are arranged between the disk 39 and the partition wall part 35 of the valve housing 13 and between the partition wall part 35 and a nut body 40 screwed to the screw shaft 22, respectively.

Figure 3:
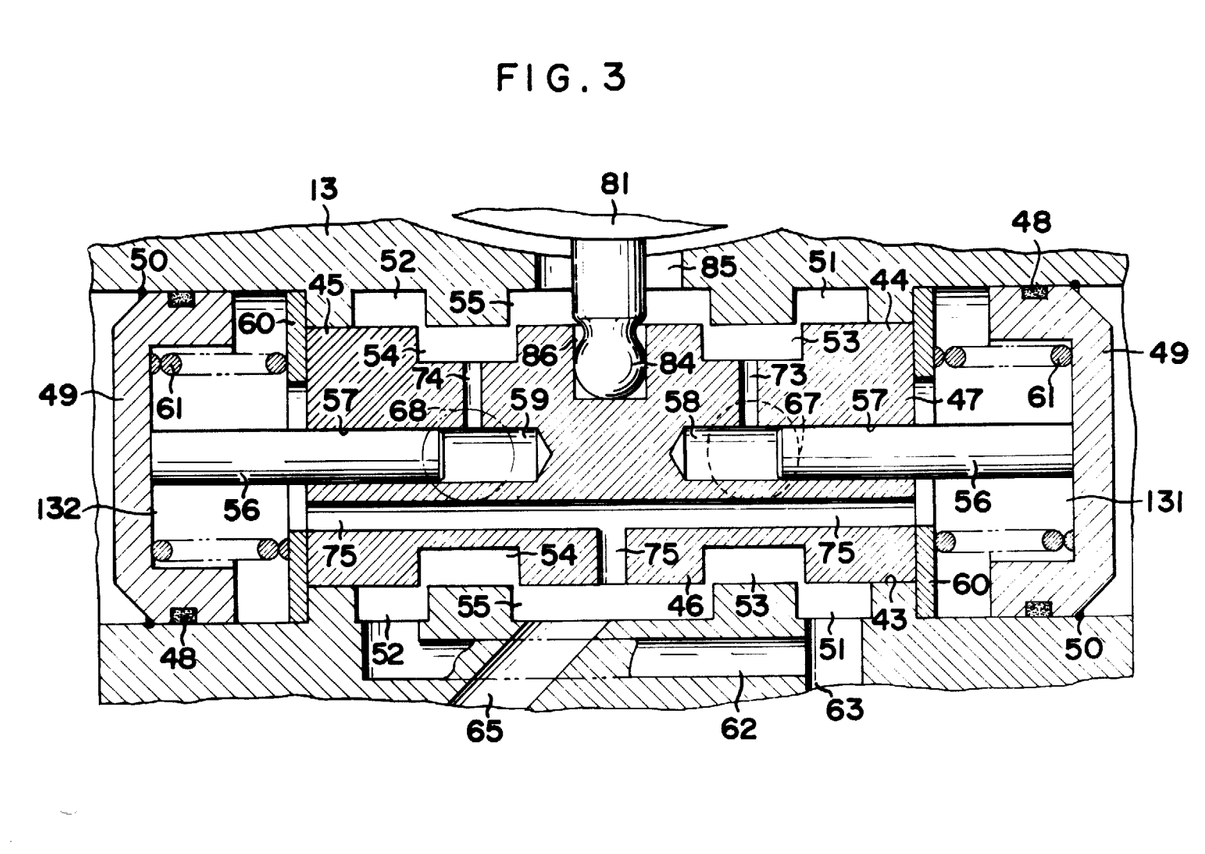
FIG. 3 an enlarged cutaway side view of the control valve section.

Furthermore, the valve housing 13 has a valve hole 43 at the bottom. The valve hole 43 opens at right angles to the stub shaft 19 and carries a control valve 47 sliding freely with three lands 44 45 46 as seen in FIG. 3. Both ends of the valve hole 43 are closed, after attachment of a cap body 49 with a seal at the circumference, by fixing with a snap ring 50. Thus, the valve hole 43 is separated into seven chambers 51 52 53 54 55 131 132. Also, rods 56 extending inwards from the said cap body 49 are inserted into a hole 57 bored in the control valve 47 to separate the top into chambers 58 59, while a center spring 61 incorporated between the cap body 49 and both ends of the control valve 47 via a washer 60 acts to keep the control valve 47 normally at the neutral position against the valve hole 43 as illustrated.

As seen from FIGS. 1 and 3, the chambers 51 52 are connected to the supply port 64 through passages 62 63 bored in the valve side body 13 and the chamber 55 is connected to the delivery port 66 through a passage 65, while the chamber 51 is connected to the pressure chamber 28 located at the right side of the actuator section 12 through a passage 67 bored in the valve side body 13. In addition, the chamber 52 is connected to the pressure chamber 29 at the left side through a passage 68 bored in the valve side body 13, a passage 70 of the pressure chamber side body 14 joined to the preceding passage by a seal 69, the chamber 71 carrying the sector gear 33 and a hole 72 bored in the piston body 21, while the chambers 53 54 are connected to the chambers 58 59 through passage holes 73 74 bored in the control valve 47, respectively, and the chambers 131 132 are connected to the central chamber 55 of the valve hole 43 through a passage 75 bored in the control valve 47. Thus the chambers 53 54 form an underlap valve which open slightly to the chambers 51 52 55 of the valve hole 43 side under the condition that the control valve 47 is kept at the neutral position as illustrated.

In order to switch the control valve 47 selectively to the left or the right according to the direction of rotation of the stub shaft 19, a control device consisting of two sets of differential gear mechanism is arranged in the valve housing 13 as shown in FIGS. 1 and 2.

Namely, this control device 76 involves two sets of differential gear mechanism which include planet gears 79 80 that are supported, rotating freely, with the shafts 77 78 against the disks 38 39 arranged on the stub shaft 19 and the screw shaft 22, respectively, ring gears 81 82 interlocking with each of the planet gears and a sun gear 83 interlocking simultaneously with both of the planet gears 79 80 so that the sun gear 83 may rotate around the stub shaft 19.

The ring gear 81 interlocking with the planet gear 79 of the stub shaft 19 side has a protruding arm 84, the top of which extends into the valve hole 43 through a hole 85 bored in the valve side body 13 and which is fixed firmly in a notch 86 of the central land 46, so that the control valve 47 may be switched selectively to the left or right along the valve hole 43 by means of the said arm 84. The other ring gear 82 interlocking with the planet gear 80 of the screw shaft 22 side has worm wheel teeth 87 at the circumference which interlock with a worm 90 fixed to the shaft 89 of a correction input motor 88 arranged at the top of the valve side body 13.

From the above explanation, the structure of the power steering system shown in FIGS. 1–3 is seen as an exemplary embodiment of the present invention. It will be explained further how to use the system and how it works.

Figure 8A:
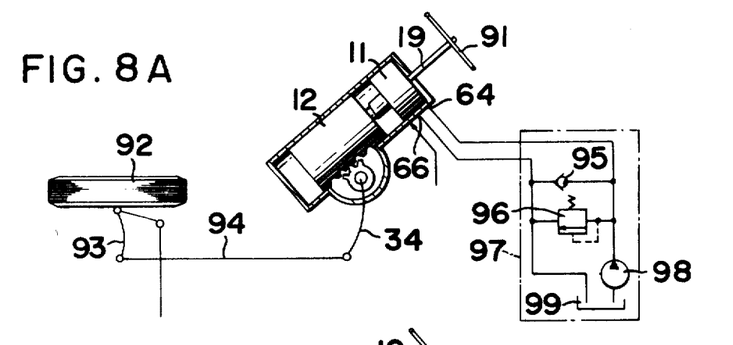
FIGS. 8A–8D are diagrams outlining application examples of the present invention.

FIG. 8 A indicates schematically an example of applications of the power steering system 10 shown in FIGS. 1–3. The stub shaft 19 is connected to the steering wheel 91 and the pitman arm 34 is linked to the knuckle arm 93 of a vehicular road wheel 92 through a connecting rod 94, while the supply port 64 and the delivery port 66 are connected to the pump 98 of the hydraulic pressure source 97 carrying a one-way valve 95 and relief valve 96, and to the tank 99 of the said hydraulic pressure source 99, respectively as shown in the figure.

Thus, when the steering wheel 91 is turned to the left to rotate the stub shaft 19, i.e., the input shaft, to the left (counterclockwise in FIG. 2), firstly the screw shaft 22, i.e., the output shaft, will be connected to the road wheel 92 through the piston body 21, sector gear 33 and pitman arm 34 and be limited in rotation due to the turning resistance of the road wheel 92. Thus, the planet gear 80 supported by the disk 39 of the screw shaft 22 will be unable to revolve. At the same time, since the ring gear 82 interlocking with the said planet gear 80 is prevented from rotating by the correction input motor 88, the sun gear 83 will be unable to rotate either and eventually, as the stub shaft 19 is turned to the left, the planet gear 79 supported by its disk 38 will rotate while revolving around the stopped sun gear 83 to turn the ring gear 81 interlocking with the said planet gear 79 to the left and displace the control valve 47 to the right (in FIG. 2) with the arm 84. In the example above, the rotation of the ring gear 82 is prevented by means of the correction input motor 88. As will be mentioned below, the reason is that the relative characteristics between the input and the output may thus be changed variously by switching the control valve 47 according to signals applied to the correction input motor 88 from outside independently of the stub shaft 19, i.e., the input shaft. In case where such a correction input is unnecessary, the ring gear 82 may be attached directly to the valve side body 13 so as to prevent its rotation.

As the control valve 47 is thus displaced to the right, the pressure-actuating liquid sent to the supply port 64 from the pump 98 may be led to the pressure chamber 28 at the right-hand side of the actuator section 12 through the chambers 51 53 and the pasage 67, while the pressure chamber 29 at the left side is connected to the tank 99 through the hole 72 of the piston body 21-chamber 71-passages 70 68 and chambers 54 55-passage 65-delivery port 66 of the control valve section 11. As a result, the piston body 21 receives hydraulic pressure from the pressure chamber 28 and starts to move to the left.

This movement of the piston body 21 is transmitted not only through the rack 32, the sector gear 33, pitman arm 34, connecting rod 94 and knuckle arm 93 to the road wheel 92 to turn it to the left, but also through balls 25 to the screw shaft 22 to rotate it to the left, i.e., in the same direction as the stub shaft 19. As a result, the planet gear 80 begins to revolve both round the ring gear 82 and on its axis and the movement is transmitted to the planet gear 79 of the stub shaft 19 side, causing the stub shaft 19 and screw shaft 22 to undergo the same rotation with a phase difference. The revolution and rotation of both planet gears 79 80 then become coincident, stopping the ring gear 81 interlocking with the said planet gear 79. As long as the steering wheel 91 is turning to the left, therefore, the arm 84 of the ring gear 81 keeps the control valve 47 in the position switched to the right so that the pressure-actuating liquid may be sent continuously to the right pressure chamber 28 from the pump 98. Thus, the piston body 21 will move to the left due to the said hydraulic pressure while turning the road wheel 92 to the left.

At the same time, the delivery pressure of the pump 98, occurring in proportion to the turning resistance of the road wheel 92 is led to the chamber 58 of the control valve 47 through the chamber 53 and passage 73. Since the other chamber 59 is connected to the tank 99 through the passage 74 and chamber 54, the difference in pressure of these two chambers 58 59 will produce a force to push the control valve 47 back to the left. As the force is transmitted from the arm 84 to the steering wheel 91 through the ring gear 81, planet gear 79 and stub shaft 19, the driver may sense a hydraulic reaction in proportion to the turning resistance of the road wheel 92.

Next, when the steering wheel 91 is stopped after the road wheel 92 was turned to the left to a desired angle, the stub shaft 19 will stop simultaneously and constrain the revolution of the planet gear 79, while the control valve 47 will remain switched to the right. The piston body 21, therefore, will still continue to move to the left, actuating the other planet gear 80 to revolve through the screw shaft 22. As a result, this movement is transmitted through the sun gear 83 and planet gear 79 to the ring gear 81 to rotate it to the right, i.e., in the direction required to bring the control valve 47 back to the neutral position. When the degree of relative angular displacement between the stub shaft 19 and the screw shaft 22 is restored to the original starting position, the control valve 47 will also be restored to the neutral position to stop the movement of the piston body 21 and is now ready for the next operation.

The explanation has been made so far referring only to the case where the steering wheel 91 is turned to the left. Since the system is designed symmetrically in respect to the turning direction of the steering wheel 91, however, it is quite clear that in the case where the steering wheel 91 is turned to the right the control valve 47 will be switched to the opposite direction to move the piston body 21 to the right while turning the road wheel 92 to the right. Thus, steering in to any direction may be practiced through the medium of fluid pressure. To be precise, the movement of the road wheel 92 will stop slightly after movement of the steering wheel 91 stops.

As seen from the above explanation, the steering wheel 91 requires a small input just sufficient to switch the control valve 47 through the medium of the planet gear unit, and therefore each of the gear parts is required to be strong enough only to transmit the forces necessary for the displacement of the control valve 47. However, if the road wheel 92 is turned by hand, for instance, in the event of failure of the hydraulic pressure source 97, the input applied to the stub shaft 19 will be transmitted through the planet gear unit to the screw shaft 22 to rotate it and move the piston body 21. Thus, each of the gear parts will have to work as a load-bearing member.

Figure 4:
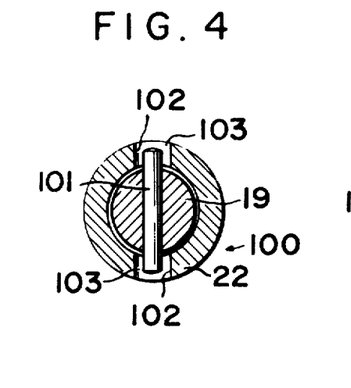
FIG. 4 a cutaway side view at the 4—4 line of FIG. 1.
Figure 5:
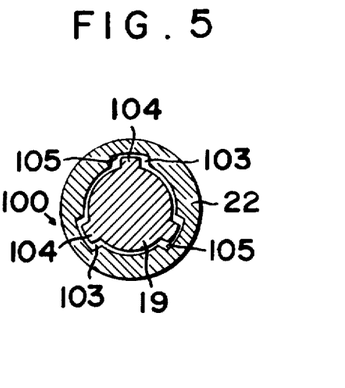
FIG. 5 a cutaway side view showing another example of the joint part.

In this connection, according to the present invention, two sets of the planet gear unit are combined symmetrically so as to match the rotations of the stub shaft 19 and the screw shaft 22 to each other. This is quite helpful in preventing the gear parts from working as load-bearing members. For instance, as seen in FIGS. 4 and 5, the fitting of the stub shaft 19 and the screw shaft 22 may be arranged by inserting a pin 101 fixed to the stub shaft 19 into a pin hole 102 of the screw shaft 22 with a certain clearance 103. Alternatively, the stub shaft 19 and the screw shaft 22 may be connected with a joint 100 which forms splines 104 105 interlocking with each other with a certain clearance 103. Thus, normally, when hydraulic pressure is available, steering will occur by switching the control valve 47 with a relative angular displacement between the stub shaft 19 and the screw shaft 22 using the clearance 103 of the joint 100. On the other hand, when hand steering is necessary for some reason, such as failure of the hydraulic pressure source 97, the input applied to the stub shaft 19 may be transmitted directly to the screw shaft 22 through the interlocking part of the joint 100, thus enabling the planet gear unit to work only as a signal transmission part and not as a load-bearing member.

As stated above, the ring gear 82 interlocking with the planet gear 80 of the screw shaft 22 is fixed to the correction input motor 88, so that the following highly advanced performance may be achieved.

a. Adaptive Control Steering

Figure 6A:
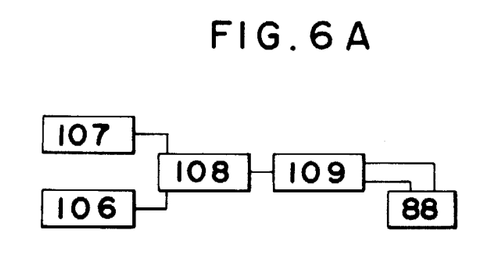
FIGS. 6A–6F are block diagrams showing an example of steering controlled by the correction input.

Referring to FIG. 6A, the set yaw rate signal is produced by the signal generator 106 according to the driving speed, actual steering angle, elastic modulus and friction coefficient between the tire and the road surface, while the detected yaw rate signal is produced by the yaw rate sensor 107 according to outside factors such as a gust of wind, puncture of a tire or unevenness of the road surface. Thus, the difference between the said two signals is detected by the deviation detector 108, the output of which is sent through the amplifier 109 to the correction input motor 88. As it rotates, the ring gear 81 is rotated through the ring gear 82, planet gear 80, sun gear 83 and planet gear 79. Thus, the ring gear 81 may obtain an output corresponding to the outside factors by switching the control valve 47 and turning the conversion wheel 92 in the direction appropriate to make the said deviation equal to zero independently of the input applied to the stub shaft 19.

b. Phase Lag Compensated Steering

Figure 6B:
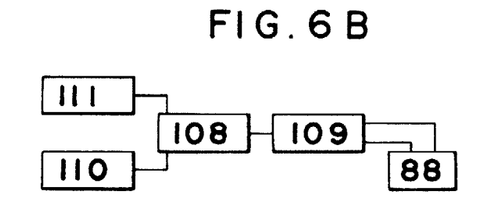

Referring to FIG. 6B, the steering angle sensor 110 produces signals corresponding to the steering angle, while the position angle sensor 111 produces signals corresponding to the actual position-angle or sideways acceleration of the vehicle. The difference between the said two signals is detected by the deviation detector 108 as a phase lag between the steering angle and the actual position-angle and is applied through the amplifier 109 to the correction input motor 88 to switch the control valve 47 so that the input rotation may be advanced against the output rotation to make the phase lag equal to zero.

c. Steering Having High Speed Stability

Figure 6C:
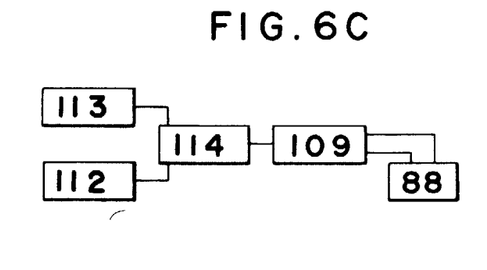

Referring to FIG. 6C, the adjustor 114 detects signals from the driving speed sensor 112 and the fluid pressure sensor 113. During the steering operation, if the actuating fluid pressure exceeds a value set beforehand against the driving speed, the adjustor 114 will send a signal through the amplifier 109 to drive the correction input motor 88 in the direction to close the control valve 47. Thus, the power of the actuator section 12 may be reduced, preventing the steering wheel 91 from being handled too lightly, particularly in high speed driving, and giving the driver an optimum steering sense.

d. Steering Having Variable Reduction Ratio

Figure 6D:
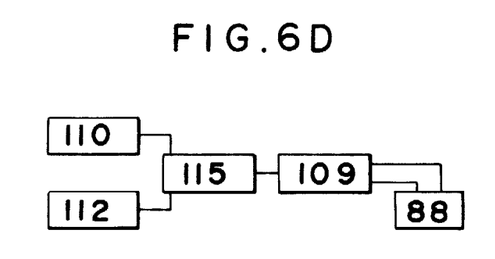

Referring to FIG. 6D, the adjustor 115 detects signals from the driving speed sensor 112 and the steering angle sensor 110 and adjusts the ratio between the input and the output rotations for each driving speed. The output from the adjustor 115 is applied to the correction input motor 88 through the amplifier 109 to operate the control valve 47 in such a manner. Thus, the gear ratio between the input and output may be changed according to the driving speed to effect stabilized steering.

e. Differentiated Steering

Figure 6E:
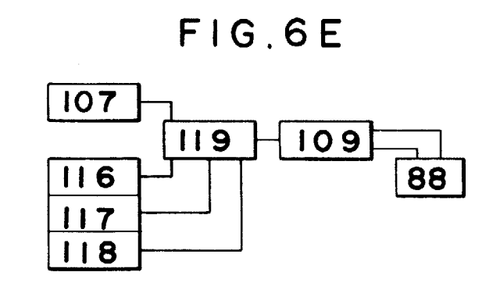

Referring to FIG. 6E, the adjustor 119 detects signals from the input speed sensor 116, the input acceleration sensor 117 and the input direction sensor 118 corresponding to the signal from the yaw rate sensor 107, and applies its output to the correction input motor 88 through the amplifier 109. Thus, when the steering wheel 91 is stopped after being turned at a certain angle, the correction input motor 88 will still continue to rotate the ring gear 82 until the yaw rate becomes zero. When the steering wheel 91 is operated at a constant speed, the ring gear 82 will continue to rotate at a speed that is determined by the planet gear ratio to keep the control valve at the starting position. Furthermore, when any positive acceleration is applied to the steering wheel 91, the ring gear 82 will be stopped, while, when any negative acceleration is applied, the ring gear 82 will be rotated to turn the output angle against the input angle accordingly. Thus, ideal steering as commonly considered from the viewpoint of human engineering, or compromise steering between the conventional type and the differential type, may be achieved.

f. Automatic Induction Steering

Figure 6F:
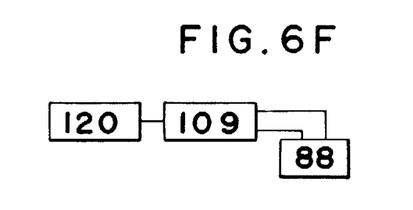

Referring to FIG. 6F, signals such as from induction signal generators buried along the road, or wireless instructions from outside or from induction units such as guide rails, are detected by the guide sensor 120, the output of which is transmitted through the amplifier 109 to the correction input motor 88, so that fully automatic steering may be achieved.

Figure 7:
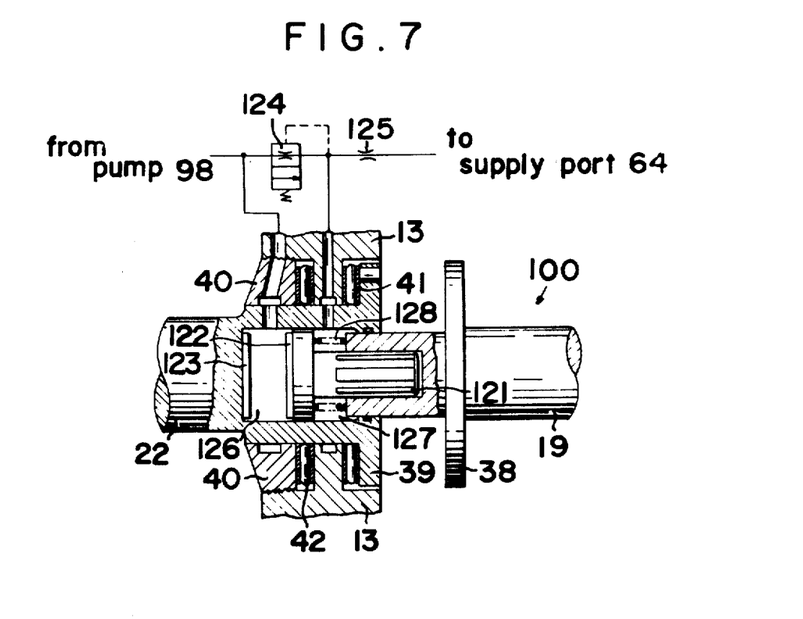
FIG. 7 a cutaway front view showing an example of a clutch device alternative to the said joint part.

In cases where the correction is minute during automatic correction steering, it will be effected by connecting the stub shaft 19 and the screw shaft 22 by means of a joint 100 such as that shown in FIGS. 4 or 5. In cases where correction is large, it is recommended that, as shown in FIG. 7, a joint 100 which has a clutch plate 122 connected to the stub shaft 19 through a spline 121 and another clutch plate 123 connected to the screw shaft 22 be employed, that a switch valve 124 and a throttle 125 be incorporated in the circuit from the pump 98 of the hydraulic pressure source 97 to the supply port 64, and that the switch valve 124 be connected at the top and the rear to the cylinder parts 126 127 of the joint 100. Thus, during the normal operation, the clutch plate 122 may be pushed against the spring 128 due to the difference in hydraulic pressure between the cylinder parts 126 127 and separated from the other clutch plate 123, cutting the connection between the stub shaft 19 and the screw shaft 22. However, when the hydraulic pressure source 97 fails or when the flow rate or the power is inadequate, the restoring force of the spring 128 will work to push the clutch plate 122 against the other clutch plate 123 so that the stub shaft 19 and the screw shaft 22 may be joined by means of the spline 121.

Figures 8B, 8C:
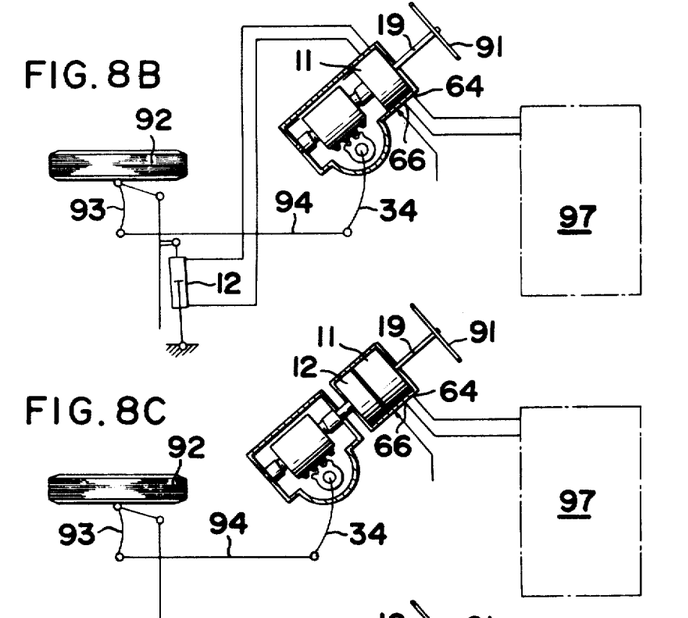
Figure 8D:
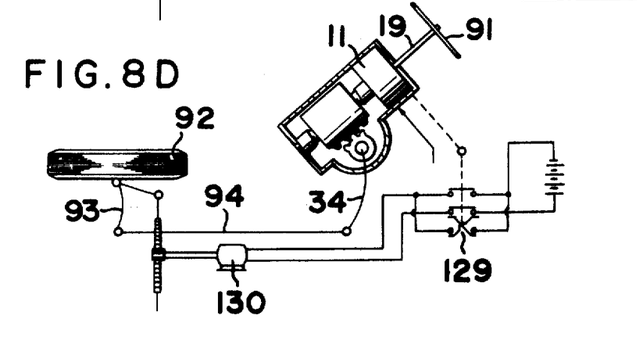
Figure 9A:
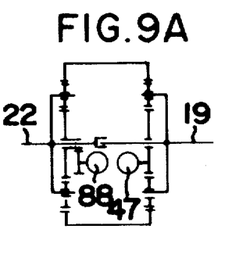
FIGS. 9A–9K are diagrams outlining combination examples of the differential mechanism.
Figure 9B:
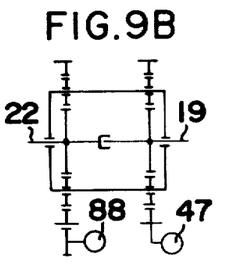
Figure 9C:
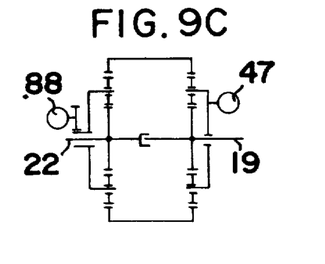
Figure 9D:
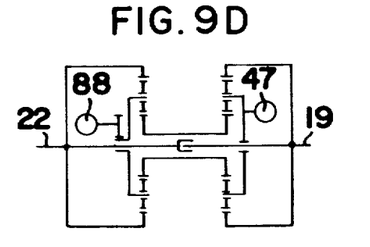
Figure 9E:
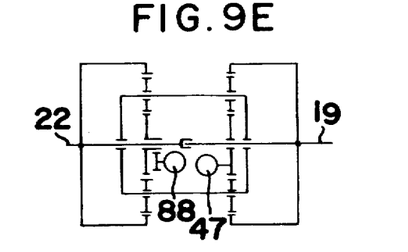
Figure 9F:
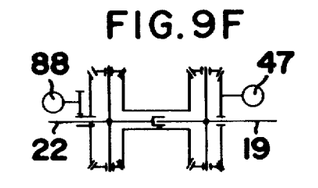
Figure 9G:
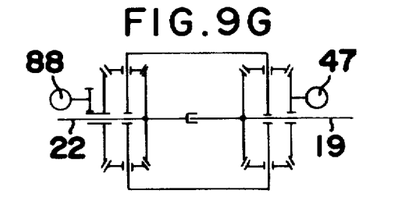
Figure 9H:
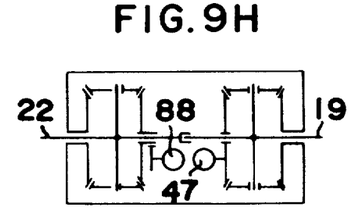
Figure 9I:
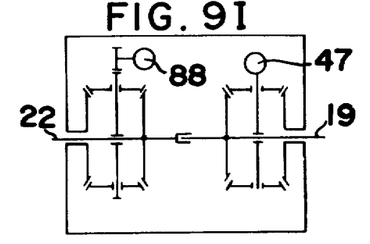
Figure 9J:
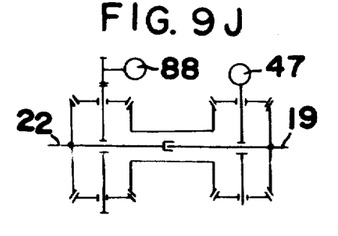
Figure 9K:
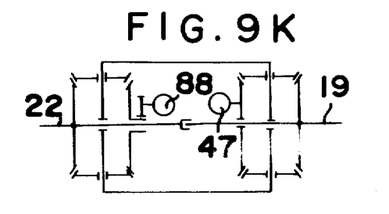

The above explanation deals with examples where the present invention was applied to a power steering system of the integral type, as shown in FIG. 8A. It is quite clear, however, that the present invention may be applied in a similar manner to other steering systems, such as the semi-integral type shown in FIG. 8B, and the torque type shown in FIG. 8C. Furthermore, it may be applied also to a steering system of the motor drive type by replacing, as shown in FIG. 8D, the control valve 47 and the actuator section 12 with a reversing switch 129 and an electric motor 130, respectively. In addition to the arrangements shown in FIGS. 1 and 2, the differential gear mechanism may also be arranged as shown in FIGS. 9A-K.

What is claimed is:

1. A power steering system, comprising a turnable input shaft and an axially aligned turnable output shaft which is adapted for connection with the road wheels of a vehicle;

connecting means connecting said input shaft with said output shaft for angular displacement relative to the output shaft through respective predetermined angles from a center position, and for joint displacement with said output shaft upon completion of the respective relative angular displacement;

a source of pressure fluid;

a valve movable from a neutral position to respective operating positions in each of which it permits the flow of pressure fluid from said source to said output shaft so as to turn the same in one or an opposite direction in dependence upon the operating position assumed by said valve; and gear transmission means connected with said valve and operable by said input shaft for moving said valve from said neutral position to one of said operating positions in dependence upon the direction in which said input shaft is turned and in response to turning of said input shaft through an angle smaller than said predetermined angle, so that said system will operate under fluid pressure when said input shaft is turned relative to said output shaft through said smaller angle, and will operate under manual force when said input shaft is turned relative to said output shaft through a larger angle in which case such manual force is directly transmitted from said input shaft to said output shaft without the aid of said gear transmission means.

2. A power steering system as defined in claim 1; and further comprising feedback means for feeding back torque from said output shaft to said input shaft.

3. A power steering system as defined in claim 1, wherein said gear transmission means comprises two gear systems; and further comprising a correction input transmission for effecting rotation of the gears of said gear system partly as a function of correction input applied to said correction input transmission from exteriorly of said power steering system.

4. A power steering system as defined in claim 1, wherein said connecting means comprises fluid-pressure operated clutch means operable in response to the pressure of fluid from said source.

5. A power steering system as defined in claim 1, wherein said gear transmission means comprises two sets of planetary gears.

6. A power steering system as defined in claim 1, wherein said gear transmission means comprises two sets of bevel gears.

* * * * *